United States Patent [19]

Farmer

[11] Patent Number: 4,948,924
[45] Date of Patent: Aug. 14, 1990

[54] STAND-OFF DEVICE FOR ENERGIZED CONDUCTOR

[75] Inventor: Marion R. Farmer, Germantown, Tenn.

[73] Assignee: Aluma-Form, Inc., Memphis, Tenn.

[21] Appl. No.: 251,124

[22] Filed: Sep. 29, 1988

[51] Int. Cl.$^5$ ............................................ H01B 17/14
[52] U.S. Cl. ................................ 174/158 R; 174/177
[58] Field of Search ...................... 174/6, 45 R, 158 R, 174/177; 52/40, 697; 248/65, 218.4, 219.4; 403/381; D8/364; D13/17, 18

[56]  References Cited

U.S. PATENT DOCUMENTS

| D. 259,113 | 5/1981 | Essig | D13/18 |
|---|---|---|---|
| 2,241,739 | 5/1941 | Schlosser | 174/45 R X |
| 3,267,202 | 8/1966 | Leonard | 174/45 R |
| 3,468,571 | 9/1969 | Farmer | 52/697 X |
| 3,494,582 | 2/1970 | Nemeth | 174/158 R X |
| 3,935,378 | 1/1976 | Heyden | 174/158 R |
| 4,412,095 | 10/1983 | Thuillier et al. | 174/158 R |
| 4,596,105 | 6/1986 | Farmer | 52/697 |
| 4,742,661 | 5/1988 | Burtelson | 52/697 |

Primary Examiner—Laramie E. Askin
Attorney, Agent, or Firm—Paul M. Bond; Paul M. Denk

[57]  ABSTRACT

A stand-off device for supporting an energized conductor from a utility pole includes an elongated self-supporting stand-off body, a utility pole connecting arm extending from the elongated body at one end for connection to a utility pole, and an energized conductor contact arm fastened to an opposite end of the elongated body. When the utility pole connecting arm is mounted or connected to a utility pole, the energized conductor contact arm at the other end of the elongated body contacts and supports an energized conductor in a stand-off position from the utility pole.

7 Claims, 2 Drawing Sheets

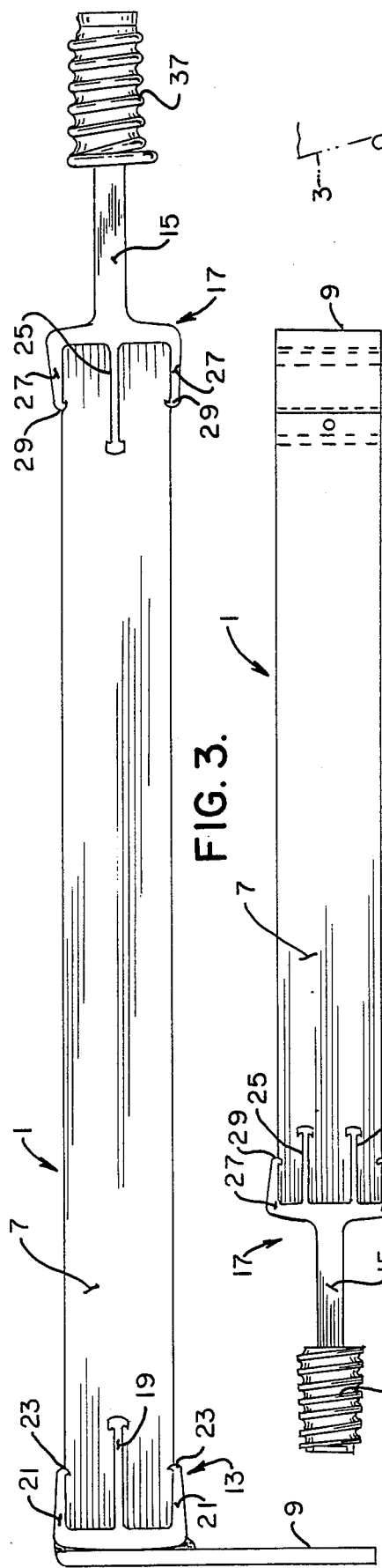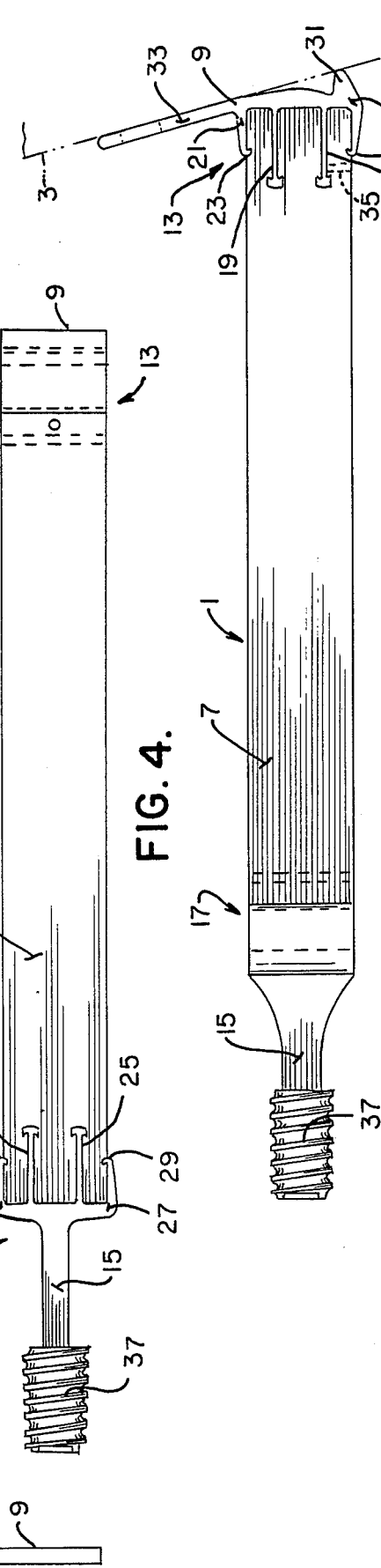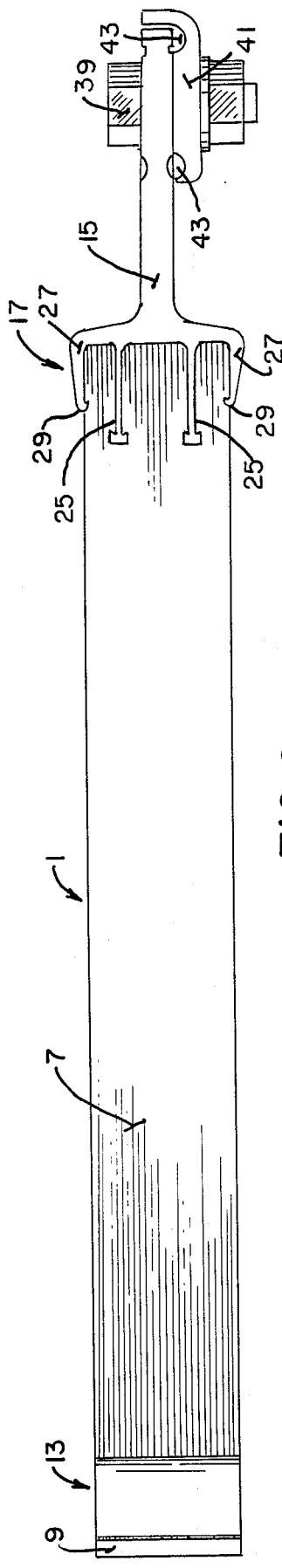

STAND-OFF DEVICE FOR ENERGIZED CONDUCTOR

BACKGROUND OF THE INVENTION

The present invention relates to a stand-off device for supporting an energized conductor from an associated utility pole, and more particularly, to a self-supporting stand-off body having a utility pole connecting arm at one end and an energized conductor contact arm at an opposite end, the later contacting and supporting an energized conductor in a stand-off position from an associated utility pole.

It is well known that electrical conducting lines associated with utility poles have static or ground wires which are directed, at periodic intervals, from the electrical conducting lines to ground. At present, ground wires from electrical conducting lines are fastened to utility poles to run down from an upper to a lower level or to the ground. As can be appreciated, there are instances where it may be desirable to train or re-direct the ground wire from the electrical conducting lines to a different location, so as to avoid entanglement with other equipment, trees and the like, as well as for safety purposes. Ground wires from electrical conducting lines have sometimes been directed along an angular wire support that extends between the utility pole and the ground; however, the space taken up by such angular wire supports and the cost thereof have made such approaches unattractive. Yet, there exists a need for a device that can train or re-direct an energized conductor or ground wire from electrical conducting lines and/or from an associated utility pole.

Generally related prior art has disclosed elongated or extension brace means for cross arms mounted to a utility pole, in order to provide a utility cross arm supporting brace. In U.S. Pat. Nos. 3,468,571 and 4,596,105, for example, such elongated or extension brace means disclose attachment means facilitating attachment of the elongated or extension brace means to utility poles. However, none of such elongated or extension brace means, including components thereof, is capable of being constructed and used for the purpose of providing a stand-off device for supporting an energized conductor from an associated utility pole. However, both of these prior art patents are owned by a common assignee of the invention herein.

SUMMARY OF THE INVENTION

Accordingly, among the several objects and advantages of the present invention may be noted:

the provision of a stand-off device for an energized conductor which fulfills the needs of the electrical utility industry while overcoming the aforenoted deficiencies of the prior art;

the provision of a new and improved stand-off device for supporting an energized conductor from an associated utility pole, or for a terminator in an electrical conducting line at a predetermined location;

the provision of the aforementioned stand-off device which trains or directs an energized conductor or the like from an associated utility pole to a lower level or to ground, as may be desired;

the provision of the aforementioned stand-off device which improves the design, construction and efficiency of installation and use of a stand-off device for training or redirecting an energized conductor from a utility pole to a lower level or to ground;

the provision of the aforementioned stand-off device that includes an energized conductor contact arm at the end of an elongated body to contact and support an energized conductor in a stand-off position from an associated utility pole;

the provision of the aforementioned stand-off device wherein the energized conductor contact arm is constructed to enable an energized conductor to be torsionally wound thereon or clamped between clamping plates associated therewith;

the provision of the aforementioned stand-off device which includes a utility pole connecting arm that is constructed to extend substantially normal to or at an angle to the longitudinal axis of an associated utility pole;

the provision of the aforementioned stand-off device which includes an elongated wood body and aluminum utility pole connecting arm and energized conductor contact arm, with integral fastener elements associated therewith, for attaching same to the elongated wood body, in providing the stand-off device of the present invention; and the provision of the aforementioned stand-off device which is simply constructed, easy to manufacture, economical to produce, easy to install, is durable in use, has low maintenance, and is otherwise well adapted for the purposes intended.

Briefly stated, the present invention provides a stand-off device for supporting an energized conductor from an associated utility pole and includes an elongated self-supporting stand-off body; a utility pole connecting arm extending substantially transverse to and fastened to the elongated body at one end thereof; and an energized conductor contact arm fastened to an opposite end of the elongated body. Upon attachment of the utility pole connecting arm at one end of the elongated body to an associated utility pole, the energized conductor contact arm at the other end of said elongated body contacts and supports an energized conductor in a stand-off position from associated utility pole.

The utility pole connecting arm and the energized conductor contact arm include integral fastener elements for interlocking engagement with the elongated body at opposite ends thereof. The elongated self-supporting stand-off body is preferably made of wood while the utility pole connecting arm including integral fastening elements and/or the energized conductor contact arm including integral fastening elements are made of aluminum.

The integral fastening elements of the utility pole connecting arm and the energized conductor contact arm are constructed for interlocking engagement with the elongated body at opposite ends thereof. Specifically, the integral fastening elements include at least one enlarged head stud fastener, and preferably a pair of spaced enlarged head stud fasteners which are interlockingly engaged within the interior of the elongated wood body and a pair of spaced fingers extending over the outer side wall surfaces of the elongated body with internally directed fastener hooks at free ends thereof for interlocking engagement with the elongated wood body.

The stand-off device may be constructed to offer a variety of different embodiments including an outer face on the utility pole connecting arm which includes a shoulder extending from one end thereof to cause the stand-off device to be angularly offset relative to the longitudinal axis of a utility pole when the stand-off is attached thereto. Other modifications include a series of lead-cast convolutions provided on the energized conductor contact arm along at least a part thereof to enable the energized conductor to be wrapped therearound or a clamping plate mounted on the energized conductor contact arm for clamping an energized conductor therebetween.

These and other objects and advantages of the present invention will become more apparent from the ensuing description.

BRIEF DESCRIPTION OF THE DRAWINGS

In the drawings,

FIG. 3 is a front elevational view of the stand-off device shown in FIG. 1 of the drawings;

FIG. 4 is a front elevational view, of another modified form of energized conductor contact arm associated with the stand-off device of the present invention;

FIG. 5 is a front elevational view, of a modified form of utility pole connecting arm for a stand-off device constructed according to the present invention; and FIG. 6 is a slightly enlarged front elevational view of still another modified form of energized conductor contact arm for use with a stand-off device constructed in accordance with the present invention;

DESCRIPTION OF THE PREFERRED EMBODIMENTS

In the description that is to follow, the term "energized conductor" includes ground or static wires from electrical conducting lines, a terminator or terminating line from an electrical conducting line or the like which emanates from electrical conducting lines, particularly used in conjunction with an associated utility pole or the like.

Figure 1:
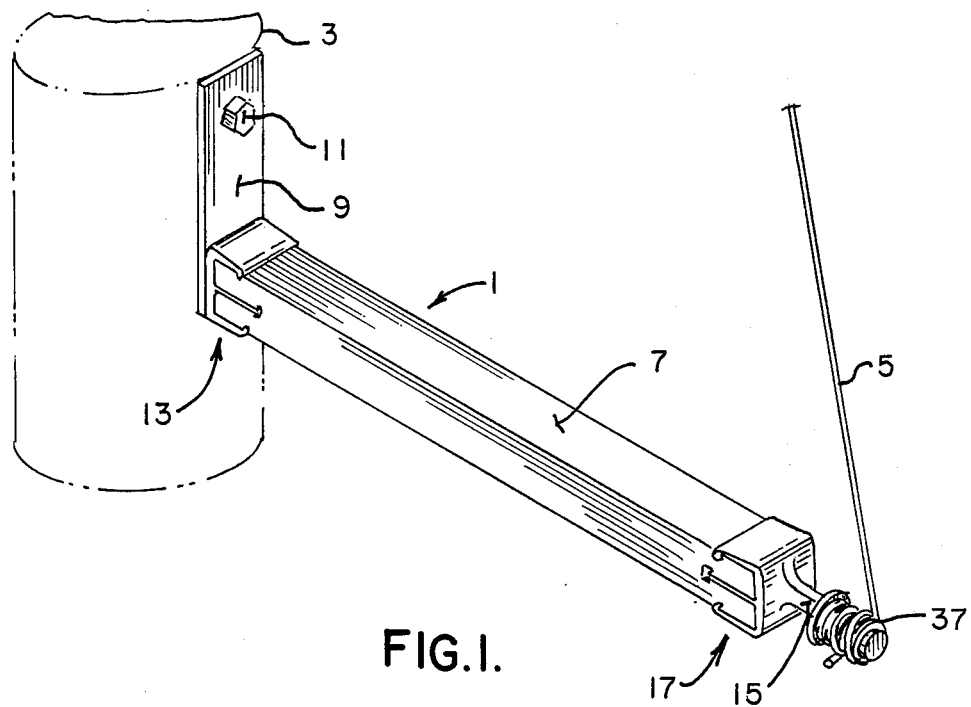
FIG. 1 is an isometric view of a stand-off device for an energized conductor which is constructed in accordance with the teachings of the present invention.

As best seen in FIG. 1 of the drawing, the stand-off device, generally identified at 1 is adapted to be mounted to a utility pole 3 for training or directing an energized conductor 5 that extends from an associated utility pole 3 to a lower level or to the ground surface. The stand-off device 1 includes an elongated self-supporting stand-off body 7 preferably formed from a non-conductive material such as wood, plastic or the like. Where wood is choosen, the preferred wood material is an imported Southeast Asia wood, from the Dipterocarpus genus generally known as Apitong wood. As is well known, this particular genus of wood is capable of withstanding long term use under a variety of environmental conditions, without rotting or otherwise losing its inherent strength.

The elongated self-supporting stand-off body 7 is preferably polygonally shaped to also aid in the rigidity and strength thereof. In the drawings, the choosen polygonal shape is a square cross sectional configuration.

In order to attach the elongated self-supporting stand-off body 7 to the utility pole 3, there is provided a utility pole connecting arm or bracket 9 which extends substantially transverse to and is fastened to the elongated body at one end thereof. The utility pole connecting arm 9 includes a suitably sized opening for receiving the fastener 11 which extends through the utility pole connecting arm 9 for attaching a stand-off device 1 to the utility pole 3. Also attached to the utility pole connecting arm are integral fastening elements 13, to be described in detail below, which are constructed for interlocking engagement with the elongated body 7 at one end thereof. Normally, the arm 9 will extend upwardly when attached to the utility pole.

At the other end of the elongated body 7 is an energized conductor support or contact arm or bracket 15 for contacting and supporting the energized conductor 5 in a standoff position from an associated utility pole 3. Integrally associated with the energized conductor contact arm 15 are fastener elements 17 for interlocking engagement with an opposite end of the elongated body 7, also to be described in detail below.

Reference is now made to FIG. 3 of the drawings which illustrates the manner in which the integral fastening elements 13, 17, associated with the utility pole connecting arm 9 and the energized conductor contact arm 15, are constructed for interlocking engagement with the elongated body 7. It will be noted that the integral fastening elements 13 include an enlarged head stud fastener 19, formed as a central rib, extending generally centrally within the interior of the elongated body 7 and having a pair of spaced fingers or flanges 21 extending over and complementarily configured to the outer side walls of the elongated body 7, with internally directed fastener hooks or barbs 23 at the free ends thereof, also constructed for interlocking engagement with the elongated body 7. In assembling the integral fastener elements 13 relative to the elongated body 7, suitable complementarily shaped openings are provided in one end of the elongated body 7 for receiving the enlarged head stud fastener 19, as well as for receiving the inwardly directed hook portions 23, 23 extending from the free ends of the fingers 21, 21. Note further that the spaced fingers 21, 21 are in contact with the exterior sides or walls of the elongated body 7, on opposite sides thereof, to assist in providing a structurally integrated and rigid mounting support for the elongated body 7 relative to the integral fastening elements 13 and transversely extending connecting arm 9 integrally associated therewith. Similarly, the integral fastener elements 17 include an enlarged head stud fastener 25 extending centrally within the interior of the elongated body 7 and a pair of spaced fingers 27 having inwardly directed hook portions 29, 29, all of the foregoing engaging the elongated body 7 at an opposite end from the integral fastening elements 13, to mount and support the energized conductor contact arm 15 in rigid and supported relationship relative to the elongated body 7.

Various different constructions and modifications may be employed in the different forms and embodiments of the invention, all of which are considered to be coming within the scope of the present invention. For example, as shown in FIG. 4 of the drawings, the integral fastening elements 17, associated with the energized conductor contact arm or bracket 15, may be provided with a pair of spaced enlarged head stud fasteners 25, 25 which extend within the interior of the elongated body 7. Note also in FIG. 4 that the integral fastener element 17 and the energized conductor contact arm 15 integrally associated therewith are fastened to one end of the elongated body 7 in interlocking engagement therewith 90° offset from the utility pole connecting arm 9 and associated integral fastening elements 13 at the opposite end of the elongated body 7.

Thus, the enlarged head stud fasteners and spaced fingers of the integral fastening elements 13, 17 at opposite ends of the elongated body 7 may be generally aligned with or offset 90° from one another, as may be desired.

In FIG. 5 of the drawings, the utility pole connecting arm or bracket 9 includes a shoulder 31 which extends from an outer face at one end thereof, for engaging associated utility pole 3, and at least part of the utility pole connecting arm 9 is slightly angularly offset from a plane extending transverse to the elongated body 7, for co-planar alignment of the outer face of the angularly offset portion 33 of the utility pole connecting arm 9 with the outermost extent of the shoulder 31, in order to angularly offset the stand-off device 1 relative to a horizontal plane extending transversely to the longitudinal axis of the utility pole 3. Thus, the stand-off device 1 may extend preferably upwardly, or even downwardly, or to one side, at an angle from the utility pole 3, as may be desired. FIG. 5 of the drawings further illustrates a pair of enlarged head stud fasteners 19, 19 formed in the integral fastening elements 13, thereby indicating that one or more of enlarged head stud fasteners may be provided in the integral fastening elements 13, 17, for particular applications. As a further added feature, an independent fastener rod or rod 35 may be driven or inserted into the elongated body 7 between the end of the hook portion 23 at the free end of each finger 21 and the enlarged head of the enlarged head stud fastener 19, to further assist in limiting retrograde movement or disassembly of the integral fastener elements 13 relative to the elongated body 7.

Figure 2:
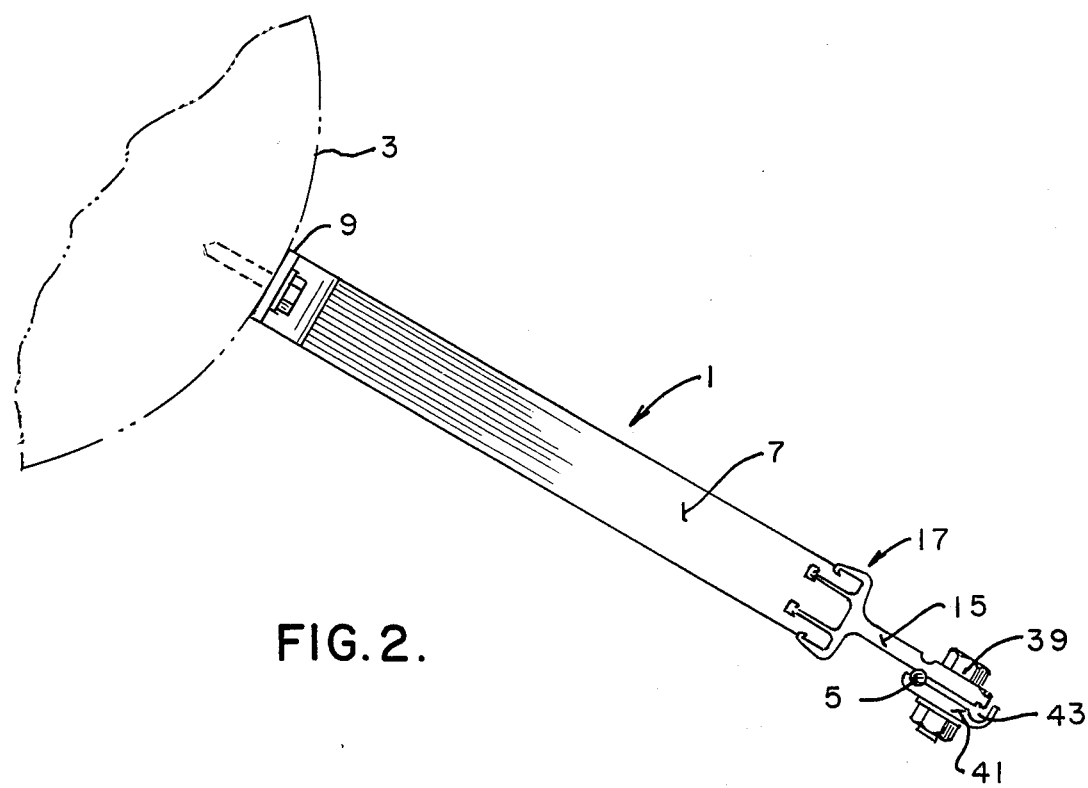
FIG. 2 is a top plan view of a modified form of stand-off device coming within the purview of the present invention.

In the above discussions, the manner in which the utility pole connecting arm 9 was attached by the fastener 11 to the utility pole 3 was explained; however, the contact and support of the energized conductor 5 by the energized conductor contact arm 15 requires further explanation. As shown in FIGS. 1 and 3-5 of the drawings, the energized conductor contact arm 15 includes a series of convolutions 37 along at least a part thereof to enable the energized conductor to be wrapped therearound. Preferably, the convolutions 37 are lead cast on the aluminum energized conductor contact arm 15 to facilitate wrapped engagement of the energized conductor 5, or the threading of an insulator thereon, as is well known. In lieu of the series of convolutions 37, the energized conductor contact arm 15, as shown in FIGS. 2 and 6 of the drawings, may be provided with an opening adjacent the free end thereof for receiving the threaded fastener 39 so as to mount a clamping plate 41 relative to the energized conductor contact arm 15. This construction enables an energized conductor 5 to be clamped within suitably configured and shaped openings 43, in either the clamping plate 41 or the energized conductor contact arm 15, for receiving the energized conductor 5 therein in clamped relationship between the clamping plate 41 and the energized conductor contact arm 15, as will be apparent.

From the foregoing, it will be appreciated that the stand-off device 1 may be used for training or redirecting from an upper to a lower level or to ground an energized conductor 5 that extends from an associated utility pole 3. The stand-off device including the elongated self-supporting stand-off body 7, preferably made of wood, and the utility pole connecting arm 9 with associated integral fastening elements 13 and energized conductor contact arm 15 with associated integral fastening elements 17, both preferably made from aluminum, are in integral interlocking engagement relative to one another, as described above. The so constructed stand-off device 1 may then be used to train or redirect the energized conductor 5 from an upper to a lower level or to ground, while being mounted in contacting and supporting relationship to the energized conductor contact arm 15 at the outer free end of the elongated body 7.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. A stand-off device for supporting an energized conductor from an associated utility pole, comprising, an elongated self-supporting stand-off body, a utility pole connecting arm extending substantially transverse to said elongated body and fastened to one end of said elongated body, an energized conductor support arm being fastened to the opposite end of said elongated body, said utility pole connecting arm including integral fastener elements in interlocking engagement with said elongated body at said one end of said elongated body, said energized conductor support arm including integral fastener elements in interlocking engagement with said opposite end of said elongated body, said elongated self-supporting stand-off body being made of wood and said utility pole connecting arm including said integral fastener elements and said energized conductor support arm including said integral fastener elements being made of aluminum, the integral fastener elements of said utility pole connecting arm and said energized conductor support arm each including at least one enlarged head stud fastener in interlocking engagement with the interior of said elongated stand-off wood body and a pair of spaced fingers extending over outer wall surfaces of said elongated stand-off wood body and having internally directed fastener hooks at free ends thereof also in interlocking engagement with said elongated stand-off wood body, said energized conductor support arm being longitudinally aligned with and extending away from said opposite end of said elongated wood body, said elongated stand-off wood body having a polygonal cross-sectional configuration, and said pair of spaced fingers of said utility pole connecting arm and said energized conductor support arm being complementarily shaped relative to the polygonal shape of said elongated stand-off wood body, whereby upon attachment of said utility pole connecting arm at said one end of said elongated body to a utility pole, the energized conductor support arm at the opposite end of said elongated body contacts and supports an energized conductor in a stand-off position from the utility pole.

2. The stand-off device as defined in claim 1 wherein an outer face of said utility pole connecting arm includes a shoulder extending from one end thereof to cause said stand-off device to be angularly offset relative to a horizontal plane extending transverse to the longitudinal axis of a utility pole when said stand-off device is attached thereto.

3. The stand-off device as defined in claim 1 wherein said spaced fingers terminate short of the enlarged head area of each of the enlarged head stud fasteners, and at least one independent fastener rod is inserted into said wood body for underlying the enlarged head area of each said enlarged head stud fastener to prevent retrograde movement from the wood body.

4. The stand-off device as defined in claim 1 wherein the spaced fingers on said utility pole connecting arm and said energized conductor support arm are angularly offset from one another.

5. The stand-off device as defined in claim 1 wherein an outer face of said utility pole connecting arm includes a shoulder extending from one end thereof for engagement with a utility pole, and at least part of said utility pole connecting arm is slightly angularly offset for co-planar alignment of the outer face of the angularly offset portion of the utility pole connecting arm with the outermost extent of said shoulder, in order to angularly offset the stand-off device relative to a horizontal plane extending transverse to the longitudinal axis of a utility pole.

6. A stand-off device for supporting an energized conductor from an associated utility pole, comprising: an elongated self-supporting stand-off body, a utility pole connecting arm extending substantially transverse to said elongated body and fastened to one end of said elongated body, an energized conductor support arm fastened to the opposite end of said elongated body, said utility pole connecting arm including integral fastener elements in interlocking engagement with said elongated body at said one end of said elongated body, said energized conductor support arm including integral fastener elements in interlocking engagement with said opposite end of said elongated body, said elongated self-supporting stand-off body being made of wood and said utility pole connecting arm including said integral fastener elements and said energized conductor support arm including said integral fastener elements being made of aluminum, the integral fastener elements of said utility pole connecting arm and said energized conductor support arm each including at least one enlarged head stud fastener in interlocking engagement with the interior of said elongated stand-off wood body and a pair of spaced fingers extending over outer wall surfaces of said elongated stand-off wood body, and having internally directed fastener hooks at free ends thereof also in interlocking engagement with said elongated stand-off wood body, said energized conductor support arm being longitudinally aligned with and extending away from said opposite end of said elongated wood body, said energized conductor support arm including a series of lead cast convolutions along at least a part thereof to enable an energized conductor to be supported thereon, whereby upon attachment of said utility pole connecting arm at said one end of said elongated body to a utility pole, the energized conductor support arm at the opposite end of said elongated body contacts and supports an energized conductor in a stand-off position from the utility pole.

7. A stand-off device for supporting an energized conductor from an associated utility pole, comprising, an elongated self-supporting stand-off body, a utility pole connecting arm extending substantially transverse to said elongated body and fastened to one end of said elongated body, an energized conductor support arm fastened to the opposite end of said elongated body, said utility pole connecting arm including integral fastener elements in interlocking engagement with said elongated body at said one end of said elongated body, said energized conductor support arm including integral fastener elements in interlocking engagement with said opposite end of said elongated body, said elongated self-supporting stand-off body being made of wood and said utility pole connecting arm including said integral fastener elements and said energized conductor support arm including said integral fastener elements being made of aluminum, the integral fastener elements of said utility pole connecting arm and said energized conductor support arm each including at least one enlarged head stud fastener in interlocking engagement with the interior of said elongated stand-off wood body and a pair of spaced fingers extending over outer wall surfaces of said elongated stand-off wood body and having internally directed fastener hooks at free ends thereof also in interlocking engagement with said elongated stand-off wood body, said energized conductor support arm being longitudinally aligned with and extending away from said opposite end of said elongated wood body, said energized conductor support arm including a clamping plate mounted thereto for clamping an energized conductor thereto, whereby upon attachment of said utility pole connecting arm at said one end of said elongated body to a utility pole, the energized conductor support arm at the opposite end of said elongated body contacts and supports an energized conductor in a stand-off position from the utility pole.

* * * * *